(No Model.)
T. W. ROBINSON.
HARROW.
No. 312,166. Patented Feb. 10, 1885.
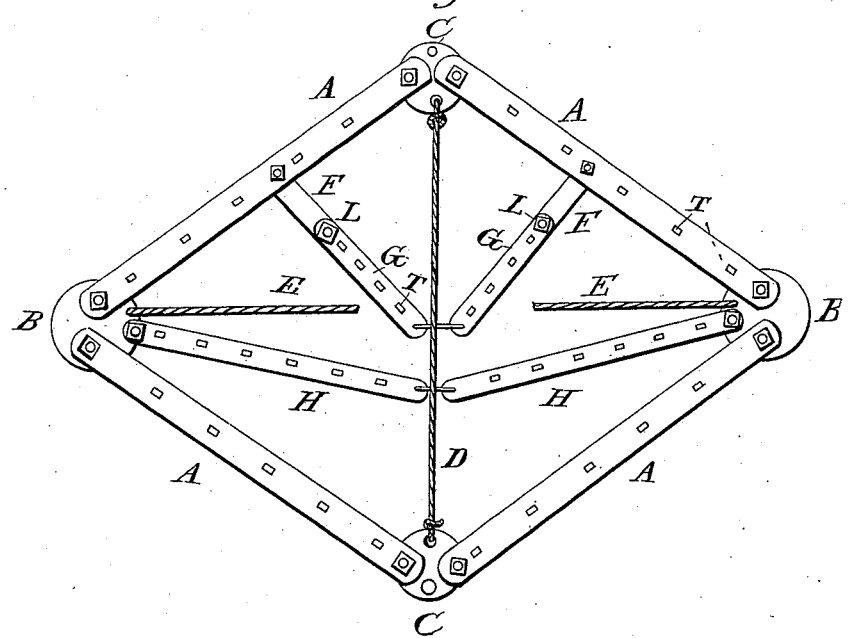
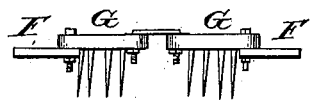
Witnesses:
S. P. McLendon
Geo. W. Hodges
Inventor.
Thomas W Robinson

UNITED STATES PATENT OFFICE.

THOMAS W. ROBINSON, OF NEAR ASHVILLE, ALABAMA.

HARROW.

SPECIFICATION forming part of Letters Patent No. 312,166, dated February 10, 1885.

Application filed June 5, 1884. (No model.)

*To all whom it may concern:*

Be it known that I, THOMAS W. ROBINSON, a citizen of the United States, residing near Ashville, in the county of St. Clair and State of Alabama, have invented a new and useful Harrow, of which the following is a specification.

This invention has relation to improvements in harrows; and it consists in the construction and novel arrangement of devices, as will be hereinafter more fully set forth, and particularly pointed out in the claim appended.

I attain these objects by the mechanism illustrated in the accompanying drawings, in which—

Figure 1 is a plan of the entire harrow. Fig. 2 is a detached elevation of beams G of subsidiary harrow.

My compound adjustable and detachable hinged harrow consists of a large quadrangular frame, A, bolted at the fore and aft angles of the line of draft to the plates C, and at the lateral angle to plates B. These plates may be single, as shown, or have a corresponding plate on the upper face of the harrow, or may be either circular, as shown, or any other convenient form.

Said harrow further consists of the subsidiary harrow H, constructed of two beams bolted at the apex to a plate, as already described, or by means of bolts, as shown, bent at right angles and passing through the ends of said beams, and secured with nuts on the under face, and with the outer ends thereof hinged to plates B by means of bolts, as shown.

Said harrow further consists of a subsidiary harrow formed of beams G F, bolted at the apex, as above, hinged together at L, and also hinged to the beam A of the larger harrow. The fore and aft angles of the outer harrow are held in position by ropes or chains D E, a portion of the rope E being removed in the figure for greater clearness. Said ropes or chains are preferably fastened to plates B C. The teeth T of the harrow are of any desirable number, shape, or inclination.

In operating the compound harrow as one implement, if it is desired to harrow a wide area, rope E is let out and rope D shortened. If it is desired to narrow the harrow because of the frequency of stumps or other obstructions, or because the soil is unusually cloddy, rope D is let out and rope E shortened. The more acute the fore and aft angles the greater are the number of teeth passing over a given space; but whether harrowing a wide or narrow space the work is done more thoroughly by the combination of the separate harrows forming a compound harrow. The harrow also, being loosely hinged or bolted together, is sufficiently flexible to adapt itself to the inequalities of surface. When the planted crop of corn or cotton is tall enough for cultivation, the subsidiary harrow may be detached from the main harrow and formed into smaller harrows by the simple process of bolting together.

The beams G may be bolted to one of the beams F, forming either a side or top harrow for cotton. If it is desired to cultivate a wide area between rows, beams H H may be bolted to one of the beams G, thus forming a larger harrow.

I am aware of Patent No. 108,690, in which the frame is composed of four sections hinged together, the two central opposite joints having hooks for the attachment of a chain, whereby the frame may be widened or narrowed by taking up or letting out the chain in the said hooks.

I am also aware that various other devices have been employed for accomplishing a similar result in this class of harrows, some of which have the frame composed of four sections, with rods extending inwardly from the joint of each section, and adjustably connected with radial arms, and therefore do not claim such devices, broadly; but

Having thus described my invention and the mode of operating the same, I claim—

The harrow herein described, consisting of the outer frame composed of the beams A and the plates B and C, connecting the same, the oblique beams G G, carrying teeth arranged within the main frame, and connected thereto by the bars F, as shown, the oblique transverse beams H H, carrying teeth, and also arranged within the main frame, with their outer ends pivotally connected to the circular plates B, and the ropes D and E, connecting the respective joints of the outer frame, whereby the same may be adjusted both transversely and longitudinally, substantially as shown and described.

THOMAS W. ROBINSON.

Attest:
S. P. McLENDON,
GEO. W. HODGES.